(12) United States Patent
Thottethodi et al.

(10) Patent No.: US 9,075,730 B2
(45) Date of Patent: Jul. 7, 2015

(54) MECHANISMS TO BOUND THE PRESENCE OF CACHE BLOCKS WITH SPECIFIC PROPERTIES IN CACHES

(71) Applicant: Advanced Micro Devices, Inc., Sunnyvale, CA (US)

(72) Inventors: Mithuna S. Thottethodi, Bellevue, WA (US); Gabriel H. Loh, Bellevue, WA (US); James M. O'Connor, Austin, TX (US); Yasuko Eckert, Kirkland, WA (US); Bradford M. Beckmann, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 272 days.

(21) Appl. No.: 13/725,011

(22) Filed: Dec. 21, 2012

(65) Prior Publication Data

US 2014/0181412 A1 Jun. 26, 2014

(51) Int. Cl.
*G06F 12/08* (2006.01)
(52) U.S. Cl.
CPC ........ *G06F 12/0871* (2013.01); *G06F 12/0848* (2013.01)
(58) Field of Classification Search
CPC .................... G06F 12/0871; G06F 12/0848
See application file for complete search history.

(56) References Cited

U.S. PATENT DOCUMENTS

| | | | |
|---|---|---|---|
| 4,334,289 A | 6/1982 | Lange et al. | |
| 5,136,582 A | 8/1992 | Firoozmand | |
| 5,434,992 A * | 7/1995 | Mattson | 711/119 |
| 5,526,511 A | 6/1996 | Swenson et al. | |
| 5,737,750 A * | 4/1998 | Kumar et al. | 711/129 |
| 5,895,488 A * | 4/1999 | Loechel | 711/135 |
| 5,926,841 A | 7/1999 | Novak et al. | |
| 6,105,111 A | 8/2000 | Hammarlund et al. | |
| 6,216,183 B1 | 4/2001 | Rawlins | |
| 6,266,715 B1 | 7/2001 | Loyer et al. | |
| 6,272,499 B1 | 8/2001 | Wooten | |
| 6,275,499 B1 | 8/2001 | Wynn et al. | |

(Continued)

FOREIGN PATENT DOCUMENTS

| | | |
|---|---|---|
| DE | 19536819 | 3/1997 |
| DE | 10211054 | 10/2003 |
| EP | 1102173 | 5/2001 |

OTHER PUBLICATIONS

"Universal Serial Bus Specification Revision 2.0", Apr. 27, 2000, chapter 10, p. 275-283 and chapter 11, p. 342-346.

*Primary Examiner* — Hiep Nguyen
(74) *Attorney, Agent, or Firm* — Rory D. Rankin; Meyertons, Hood, Kivlin, Kowert & Goetzel, P.C.

(57) ABSTRACT

A system and method for efficiently limiting storage space for data with particular properties in a cache memory. A computing system includes a cache and one or more sources for memory requests. In response to receiving a request to allocate data of a first type, a cache controller allocates the data in the cache responsive to determining a limit of an amount of data of the first type permitted in the cache is not reached. The controller maintains an amount and location information of the data of the first type stored in the cache. Additionally, the cache may be partitioned with each partition designated for storing data of a given type. Allocation of data of the first type is dependent at least upon the availability of a first partition and a limit of an amount of data of the first type in a second partition.

19 Claims, 7 Drawing Sheets

(56) References Cited

U.S. PATENT DOCUMENTS

| | | |
|---|---|---|
| 6,292,490 B1 | 9/2001 | Gratacap et al. |
| 6,311,212 B1 | 10/2001 | Chong et al. |
| 6,349,354 B1 | 2/2002 | Garney |
| 6,546,461 B1 | 4/2003 | Au et al. |
| 7,194,583 B2 | 3/2007 | Hesse et al. |
| 2002/0052987 A1 | 5/2002 | Collier |
| 2002/0116565 A1 | 8/2002 | Wang et al. |
| 2003/0051076 A1 | 3/2003 | Webber |
| 2003/0079061 A1 | 4/2003 | Azzarito et al. |
| 2003/0084250 A1* | 5/2003 | Gaither et al. ............ 711/133 |
| 2003/0177297 A1 | 9/2003 | Hesse et al. |
| 2003/0221069 A1 | 11/2003 | Azevedo et al. |
| 2004/0153588 A1 | 8/2004 | Kasper |
| 2005/0097245 A1 | 5/2005 | Lym et al. |
| 2005/0278486 A1* | 12/2005 | Trika et al. ............ 711/142 |
| 2008/0189484 A1* | 8/2008 | Iida et al. ............ 711/114 |
| 2009/0248986 A1* | 10/2009 | Citron et al. ............ 711/129 |

* cited by examiner

MECHANISMS TO BOUND THE PRESENCE OF CACHE BLOCKS WITH SPECIFIC PROPERTIES IN CACHES

BACKGROUND

1. Field of the Invention

This invention relates to computing systems, and more particularly, to efficiently limiting storage space for data with particular properties in a cache memory.

2. Background

A microprocessor may be coupled to one or more levels of a cache hierarchy in order to reduce the latency of the microprocessor's request of data in memory for a read or a write operation. Generally, a cache may store one or more blocks, each of which is a copy of data stored at a corresponding address in the system memory. Since caches have finite sizes, the total number of cache blocks is inherently bounded. Additionally, there may be a limit on the number of blocks that map to a given set in a set-associative cache. However, there may be conditions that benefit from a finer limit on a number of cache blocks associated with a given cache property than a limit offered by the cache capacity or the cache associativity. Examples of the cache property may include one or more of a coherence state, a dirty state, a source ownership state, a remote state that may be used in a non-uniform memory access (NUMA) computing system, and so forth.

Providing the finer limit on the number of cache blocks associated with the given cache property may reduce latencies for searching for the number of cache blocks and moving the number of cache blocks prior to setting the cache in a different state. The different state may be a low-power mode. Additionally, the finer limit may reduce a number of conflict misses for a set-associative or a direct-mapped cache for both cache blocks with and without the cache property.

Further, the latency for the cache to transition to a given state, such as a low-power mode, may be reduced with the finer limit. For example, to manage power consumption, chip-level and system-level power management systems typically disable portions of the chip or system when experiencing no utilization for a given time period. However, transitioning the cache to a low-power mode may be delayed until the number of cache blocks associated with the cache property are evicted and written back to lower-level memory. Without the finer limit, the transition latency may be too large. The large latency may reduce both the benefits of the power management system and the number of times the transition actually occurs despite the power management system notifications.

To allocate space for new data to be stored in the cache, such as a cache line fill following a cache miss, a cache replacement algorithm may select a given way within a given set to be replaced. If this allocation strategy does not distinguish requests associated with the cache property, then the strategy may allow a significant portion of the ways in the cache to be occupied with cache blocks associated with the cache property. Without the finer limit being utilized as previously described, operational latencies may increase, conflict misses may increase, and cache state transitions may reduce.

In view of the above, efficient methods and systems for efficiently performing data allocation in a cache memory are desired.

SUMMARY OF EMBODIMENTS

Systems and methods for efficiently limiting storage space for data with particular properties in a cache memory are contemplated. In one embodiment, a computing system includes a cache and a corresponding cache controller. The cache controller may receive a memory request for data of a first type. The request may indicate to allocate space within the cache for the data if space doesn't already exist for storage of the data. The space may include one or more available cache lines within the cache. For example, a write request or modifying request may overwrite at least a portion of the requested data. The modification may occur to a most-up-to-date version of the data, which is loaded and stored in the cache if this version of the data isn't already stored in the cache. Similar steps may occur for a read request except for the overwriting step.

The first type may correspond to one or more cache properties. The property or first type may include a cache entry valid state, dirty and clean cache states, home or local node and remote node states, cache coherence states, process or processor owner identifiers (ID's), thread ID's, system-level transaction ID's, shared and private states, instruction type and data type, and so forth. The property or the first type may also include a combination of two or more of the examples. The cache has a limit on storage space for data of the first type. The limit may be enforced regardless of whether or not contention exists for allocating data of the first type. For example, storage space may be approaching the limit although an appreciable amount of storage space may be free. The limit may still be enforced despite the available free storage space. The limit may correspond to the entire cache. Alternatively, the limit may correspond to a given partition of the cache.

In some embodiments, when the limit of an amount of data of the first type permitted in the cache is not reached regardless of whether or not contention exists for allocating data of the first type, the cache controller allocates the received data. In other embodiments, control logic within the cache controller determines in response to both receiving a memory request to allocate data of the first type and determining the limit of an amount of data of the first type permitted in the cache is not reached regardless of whether or not contention exists for allocating data of the first type, that an indication is sent to the cache to allocate the received data. If the limit is reached, other steps may be taken to remove some data of the first type already stored in order to not violate the limit before allocating the received data. The cache controller may include a data structure for maintaining both amount and location information of the data of the first type stored in the cache. The data structure may include a bit vector, a table of pointers, a linked list, and so forth.

In some embodiments, the cache is a partitioned shared cache. One or more partitions may be designated for storing data of a given type. In response to a request to allocate data of the first type and determining a designated first partition for the first type is unavailable, the shared cache controller may allocate the data of the first type in another partition different from the designated partition. For example, the shared cache controller may allocate the data of the first type in a second partition different from the first partition. In some embodiments, the first type and a second type may correspond to home or local node data and remote data in a remote node. In some embodiments, the multiple sources for memory access requests may include processors or input/output (I/O) devices in the home and remote nodes. The shared cache may be used in a shared memory, non-uniform memory access (NUMA) system.

In some embodiments, the shared cache controller may evenly distribute data of the first type corresponding to multiple received requests across the available partitions. A limit may be set for an amount of data of the first type to be allocated in another partition, such as the second partition. Alternatively, a limit may be set for a total amount of data of the first type to be stored in other partitions other than the first partition. The limit may be programmable and stored in one of multiple configuration and status registers (CSR's).

When the first partition is available again, the shared cache controller may reallocate at least a first subset of the data of the first type in the second partition to the first partition. In some embodiments, the cache controller determines the first partition is available again. For example, data of the first type with a dirty cache state in the second partition may be reallocated. Data of the first type with a clean cache state in the second partition may be evicted. Alternatively, all of the data of the first type in the second partition may be reallocated to the first partition. The shared cache controller may include a data structure for storing both amount and location information of the data of the first type in the second partition.

These and other embodiments will be further appreciated upon reference to the following description and drawings.

Figure 1:
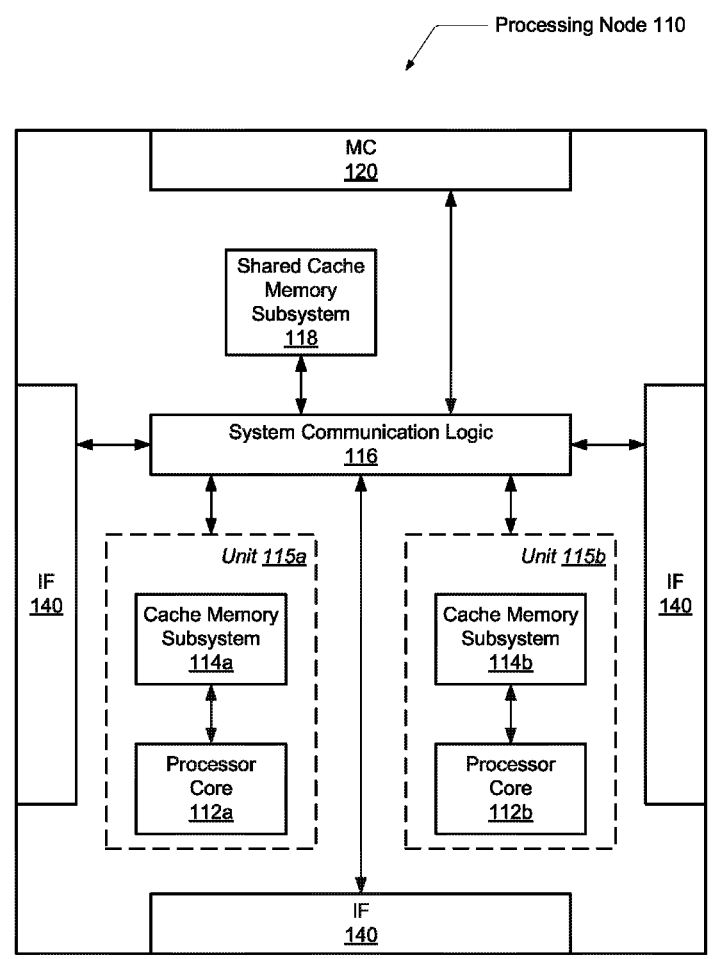
FIG. 1 is a generalized block diagram of one embodiment of a processing node.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a processing node 110 is shown. Generally speaking, processing node 110 may include memory controller 120, interface logic 140, one or more processing units 115, which may include processor cores 112a-112b and corresponding cache memory subsystems 114a-114b; system communication logic 116, and a shared cache memory subsystem 118. In one embodiment, the illustrated functionality of processing node 110 is incorporated upon a single integrated circuit. In another embodiment, the illustrated functionality is incorporated in a chipset on a computer motherboard.

In one embodiment, processing node 110 is a stand-alone system within a mobile computer, a desktop, a server, or other. In other embodiments, processing node 110 is one node within a socket of a multi-socket system. In some embodiments, the processing units 115a-115b and one or more other sources outside of processing node 110 may access the shared cache memory subsystem 118. The other sources may include general-purpose processors and graphical processing units (GPU's) on other nodes, input/output (I/O) devices, and so forth. In other embodiments, another level of cache, such as caches 114a-114b, in the cache memory hierarchy may be shared by multiple sources. Regardless of the level within the memory hierarchy, the shared cache may be partitioned. The partition may include particular ways and/or sets of a set-associative cache, banks of a multi-bank cache, and so forth.

One or more of the caches 114a-114b and 118 may have a limit on storage space for data with particular cache properties. The limit may be enforced regardless of whether or not contention exists for allocating data with the particular cache properties. For example, storage space may be approaching the limit although an appreciable amount of storage space may be free. The limit may still be enforced despite the available free storage space. A limit may correspond to an entire one of the caches 114a-114b and 118. Alternatively, a limit may correspond to a given partition of one of the caches 114a-114b and 118.

One or more sources may generate memory requests for data of a first type. The one or more sources may include the processing units 115a-115b, input/output (I/O) devices, processing units in other nodes, and so forth. A data type may simply be referred to as a type. The type may correspond to a property of cached data. For example, the property or type may include a cache entry valid state, dirty and clean cache states, home or local node and remote node states, cache coherence states, process or processor owner identifiers (ID's), thread ID's, system-level transaction ID's, shared and private states, instruction type and data type, and so forth. The property or type may also include a combination of two or more of the examples.

In response to both receiving a memory request to allocate data of the first type and determining the limit of an amount of data of the first type permitted in the cache is not reached regardless of whether or not contention exists for allocating data of the first type, a cache controller allocates the received data. The cache controller may be a controller for one of the caches 114a-114b and 118. If the limit is reached, other steps may be taken to remove some data of the first type already stored in order to not violate the limit before allocating the received data. The cache controller may include a data structure for maintaining both amount and location information of the data of the first type stored in the corresponding cache. The data structure may include a bit vector, a table of pointers, a linked list, and so forth.

In some embodiments, the cache is a partitioned cache. One or more partitions may be designated for storing data of a given type. In response to receiving a request to allocate data of the first type and determining the designated first partition for the first type is unavailable, the shared cache controller may allocate the data of the first type in another partition different from the designated first partition. For example, the cache controller may allocate the data of the first type in a second partition different from the first partition. This allocation may occur despite the designated earlier assignments.

Alternatively, the cache controller may allocate the data of the first type across multiple other available partitions different from the first partition.

As allocation requests for data of the first type are received, the cache controller may evenly distribute the corresponding data across the multiple other available partitions different from the first partition. The allocation of data of the first type may continue to occur in this manner until a limit is reached. In some embodiments, the limit may be set for an amount of data of the first type to be allocated in another partition, such as the second partition. Alternatively, a limit may be set for a total amount of data of the first type to be stored across all other partitions other than the first partition. The limit may be programmable and stored in one of multiple configuration and status registers (CSR's).

In response to determining the first partition still remains unavailable and the limit of an amount of data of the first type in the second partition is reached, the cache controller may select a subset of the data of the first type in the second partition and convert it to another type different from the first type. For example, the cache controller may remove the selected subset by evicting it. The cache controller may perform a write-back operation for a given evicted cache block if the given evicted cache block has a dirty cache state. Afterward, the cache controller may allocate the data of the first type in the second partition.

In response to determining the first partition is available again, the cache controller may reallocate at least a first subset of the data of the first type in the second partition to the first partition. For example, data of the first type with a dirty cache state in the second partition may be reallocated. Data of the first type with a clean cache state in the second partition may be evicted. Alternatively, all of the data of the first type in the second partition may be reallocated to the first partition.

As seen in the above, a cache controller may limit the amount of data of a given type in a corresponding cache, which is shared or non-shared, using similar steps as described above. Again, the limit may be programmable and stored in a one of multiple CSR's. The type may be associated with one or more cache properties as previously described. Before providing more details, a further description of the components in the processor 100 is given.

Processor cores 112a-112b include circuitry for executing instructions according to a predefined instruction set. Although two processor cores are shown in FIG. 1, the processing node 110 may include another number of processor cores, such as a single processor core, four processor cores, and so forth. The x86® instruction set architecture (ISA) may be selected. Alternatively, the x86-64®, Alpha®, PowerPC®, MIPS®, SPARC®, PA-RISC®, or any other instruction set architecture may be selected. Generally, processor cores 112a-112b access the cache memory subsystems 114a-114b, respectively, for data and instructions. As used herein, the term "access" regarding a cache memory subsystem refers to performing a read or a write request operation that may result in a cache hit if the requested data of a corresponding request address resides in the cache or a cache miss if it does not reside in the cache.

If a cache miss occurs, such as a requested block is not found in a respective one of the cache memory subsystems 114a-114b or in shared cache memory subsystem 118, then a read request may be generated and transmitted to the memory controller 120 within the node 110 to which the missing block is mapped. A corresponding cache fill line with the requested block may be conveyed to the corresponding cache in order to complete the original read or write request. In addition, the cache fill line may be placed within a corresponding set within the cache. If there are no available ways within the corresponding set, then typically a Least Recently Used (LRU) algorithm determines which way within the set is to have its data evicted and replaced by the cache fill line data. As used herein, the term "allocate" refers to storing a cache fill line fetched from a lower level of the cache hierarchy into a way of a particular cache subsequent a cache miss to the particular cache.

As used herein, a "block" is a set of bytes stored in contiguous memory locations, which are treated as a unit for coherency purposes. As used herein, the terms "cache block", "block", "cache line", and "line" are interchangeable. In some embodiments, a block may also be the unit of allocation and deallocation in a cache. The number of bytes in a block may be varied according to design choice, and may be of any size. As an example, 32 byte and 64 byte blocks are often used.

Cache subsystems 114a-114b and 118 may comprise high-speed cache memories or arrays configured to store blocks of data. A corresponding cache controller may be coupled to the cache arrays. The cache controller may include programmable configuration and status registers (CSRs) and control logic. The CSR's and the control logic may be used to limit an amount of data of a given type to be stored in the cache or in at least one partition of the cache. Cache memory subsystems 114a-114b may be implemented as a hierarchy of caches. In one embodiment, cache memory subsystems 114a-114b each represent L2 cache structures, and shared cache subsystem 118 represents an L3 cache structure. An L1 cache structure may be integrated within each of the processor cores 112a-112b. Other embodiments are possible and contemplated.

Data already presently stored in the cache may be hit for a read or a write access by any source despite the values stored in the CSR's. For example, the cache may have modified data, and, therefore, lower levels of the memory hierarchy may have corresponding stale data. The requesting source should receive the updated copy of the requested cache line. Therefore, for a particular way within a particular set of a shared cache, an access from any source is still permitted. However, allocation due to a cache miss may be determined by the availability of any partitions within the cache and values, such as a limit, stored in the CSRs.

Memory controller 120 may be used to connect the processor 100 to off-die memory. Memory controller 120 may comprise control circuitry for interfacing to memories. Memory controller 120 may follow memory channel protocols for determining values used for information transfer, such as a number of data transfers per clock cycle, signal voltage levels, signal timings, signal and clock phases and clock frequencies. Additionally, memory controller 120 may include request queues for queuing memory requests. The off-die memory may include one of multiple types of dynamic random access memories (DRAMs). The DRAM may be further connected to lower levels of a memory hierarchy, such as a disk memory and offline archive memory.

The interface 140 may include integrated channel circuitry to directly link signals to other processing nodes, which include another processor. The interface 140 may utilize one or more coherence links for inter-node access of processor on-die caches and off-die memory of another processing node. Examples of the technology include HyperTransport and QuickPath. The input/output (I/O) interface 142 generally provides an interface for I/O devices off the processor 100 to the shared cache memory subsystem 132 and processing units 110a-110d and 120. I/O devices may include many variations of computer peripheral devices.

In one embodiment, system communication logic 116 is a system bus. In another embodiment, processing node 110 incorporates a Northbridge system bus controller in logic 116 in order to couple processing units 115a-115b to an off-chip memory, input/output (I/O) devices, other off-chip processors such as a graphics processing unit (GPU), another type of single-instruction-multiple-data (SIMD) core, a digital signal processor (DSP), other general-purpose processors, and so forth. In such an embodiment, system communication logic 116 may replace or incorporate the functionality of memory controller 120 and interface logic 140.

In one embodiment, logic 116 may incorporate both a Northbridge and a Southbridge system bus controller. A Northbridge protocol may be used to couple processing units 115a-115b to off-chip memory and a GPU. A Southbridge protocol may be used to couple processing units 115a-115b to I/O Devices, a real time clock, a power management unit, or other. One example of such an embodiment of logic 116 may include the AMD-762™ Northbridge system controller and the AMD-768™ Southbridge peripheral bus controller.

In yet another embodiment, processing node 110 is one socket of a multi-socket system. System communication logic 116 may incorporate packet-processing logic in such an embodiment. Generally speaking, system communication logic 116 may be configured to respond to control packets received on the links to which the processing node 110 is coupled, to generate control packets in response to processor cores 112a-112b and/or cache memory subsystems 114a-114b, to generate probe commands and response packets in response to transactions selected by the memory controller 120 for service, and to route packets for which node 110 is an intermediate node to other nodes through interface logic 140. Interface logic 140 may include logic to receive packets and synchronize the packets to an internal clock used by packet processing logic within logic 116.

Figure 2:
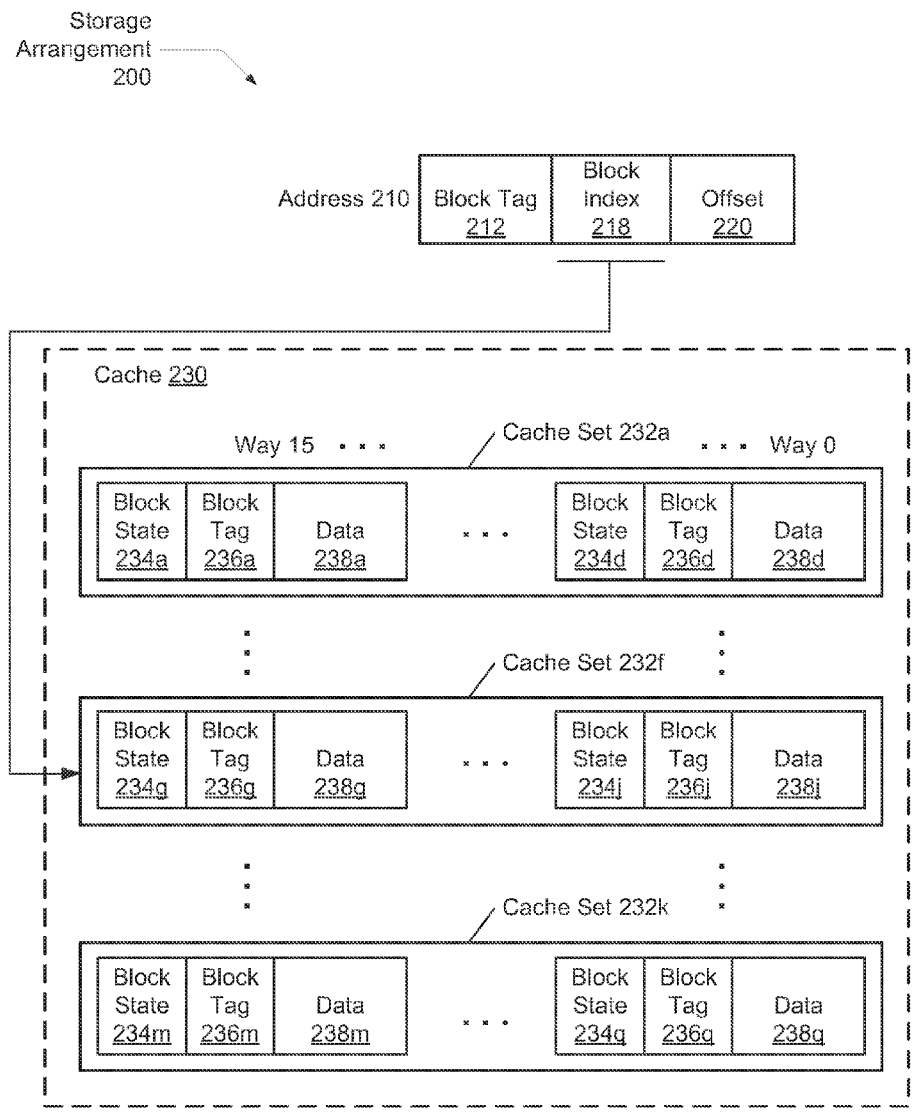
FIG. 2 is a generalized block diagram of one embodiment of a cache data storage arrangement.

Data may be stored within an array of a shared cache, such as shared cache memory 118, in various manners. For example, FIG. 2 illustrates one embodiment of a storage arrangement 200 in which data are stored using a 16-way set-associative cache organization. A different number of ways, such as 4-way, 8-way, or other, within the set-associative cache may be chosen. Alternatively, a fully associative or direct-mapped implementation may be used. A given one of the cache sets 232a-232k may be selected from other sets by a block index 218 portion of an address 210 used to access the cache 230. A cache block hit may occur when the block tag 212 and a given one of the tags 236a-236m contain a same value and a corresponding one of the block states 234a-234m designates predetermined match values such as a valid cache block.

In one embodiment, the data portions 238a-238m of a cache line, or cache block, within the cache 230 is configured to store 64 bytes. Other sizes are possible and contemplated. Each of the 16 ways of cache 230 may also store state information. A given one of the block states 234a-234m may comprise at least one or more of the following: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, and invalid; a process ID and/or a thread ID; a node ownership ID; a clean/dirty state; and so forth. Other included state information is possible and contemplated.

A given one of the block tags 236a-236m may be used to determine which of the 16 cache lines are being accessed within a chosen one of the cache sets 232a-232m. In addition, offset 230 of address 210 may be used to indicate a specific byte or word within a cache line. A given one of the cache sets 232a-232m may be chosen by the block index 218 of address 210. Although the block state and the block tag may be stored in contiguous bits with the data within each cache way, in one embodiment, the block state and the block tag may be stored in a separate array, rather than in a same array as the data.

Figure 3:
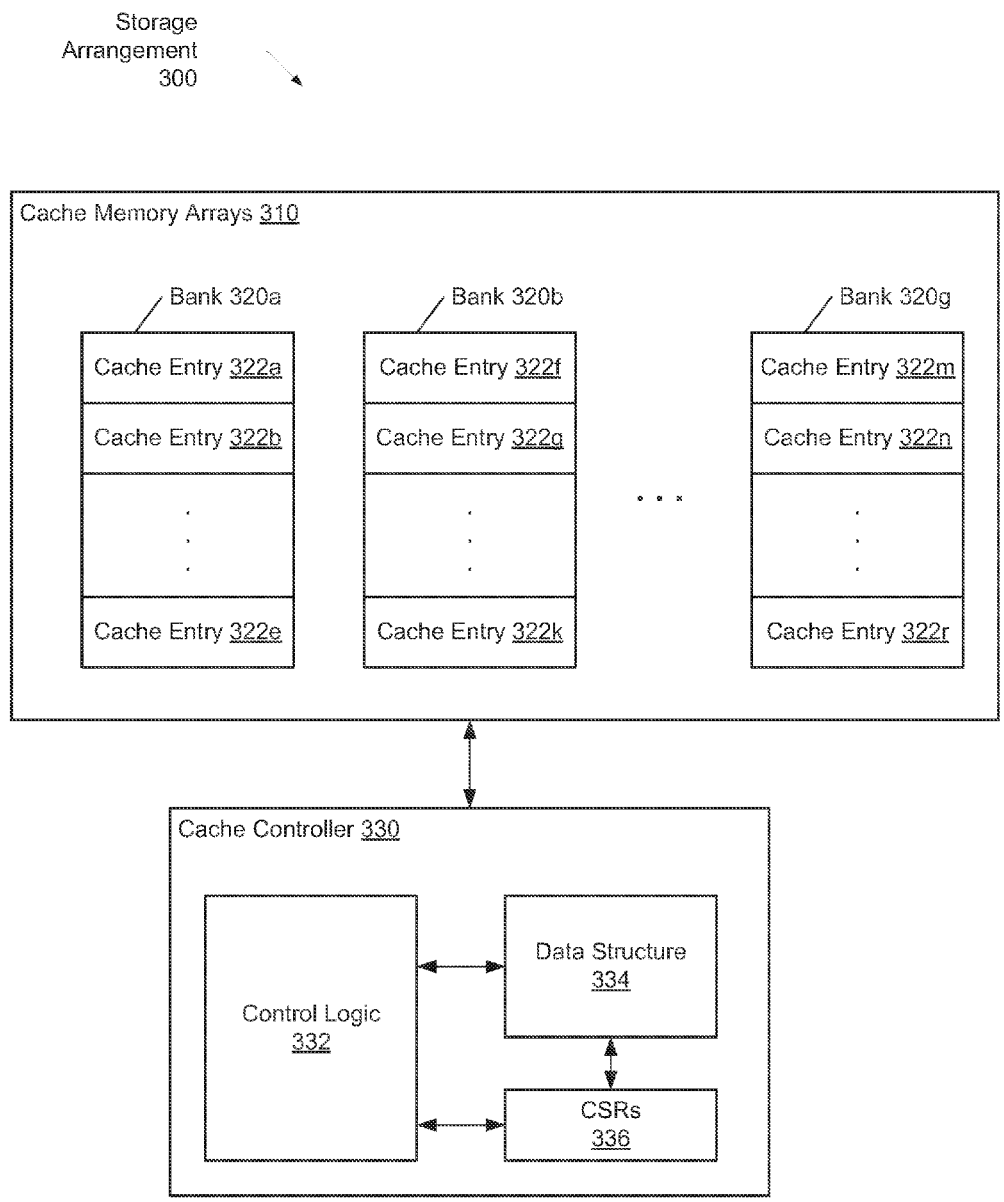
FIG. 3 is a generalized block diagram of another embodiment of a cache data storage arrangement.

Turning now to FIG. 3, a generalized block diagram illustrating another embodiment of a cache storage arrangement 300 is shown. As shown, cache 310 includes banks 320a-320g. The number of banks may vary from one embodiment to the next. Each of the banks may include multiple entries. For example, bank 320a includes entries 322a-322e, bank 320b includes entries 322f-322k and bank 320g includes entries 322m-322r. In some embodiments, each one of the banks 320a-320g has a same storage capacity. In other embodiments, one or more of the banks 320a-320g has less or more storage capacity than other ones of the banks 320a-320g. Additionally, each of a number of sets in a set-associative cache may be distributed across the banks 320a-320g.

Each of the banks 320a-320g of the cache 310 may be designated for storing data of a given data type. The type may correspond to a property of cached data as previously described. In some embodiments, each one of the banks 320a-320g corresponds to a given one of multiple nodes in a multi-node system. One of the banks 320a-320g may correspond to data associated with a home or local node. The other banks of the banks 320a-320g may correspond to data associated with remote nodes in the system. For example, the cache 310 may include eight banks with one bank for home or local data and seven banks for data associated with seven remote nodes. In some embodiments, each one of the banks 320a-320g may transition to an inactive power mode, such as being powered down, independent of the other banks.

The arrangement of cache 310 with multiple partitions, such as banks 320a-320g, may allow for efficient limiting of and searching for cache lines with a given property or type. In particular, the cache controller 330 associated with cache 310 may concurrently search for cache lines with a given type in different banks. The cache controller 330 may include control logic 332 for performing several actions. These actions may include determining a limit of an amount of data of a given type to be allocated in a given one of the banks 320a-320g, selecting one of the banks 320a-320g for allocating data, determining when each one of the banks 320a-320g is available, determining where to store data of a given type when a designated one of the banks 320a-320g is unavailable, performing steps to allocate recently received data of a given type in a given one of the banks 320a-320g and maintain an associated limit when the associated limit is reached, and so forth.

The time spent searching for cache lines of a given type arranged in a manner similar to cache 310 may be less than that spent flushing a cache in which all lines are searched. A data structure 334 may be used by the control logic 332 for maintaining both amount and location information of the data of a given type in a given one of the banks 320a-320g. The data structure 334 may include at least one of a bit vector, a table of pointers, a linked list, and so forth. The data structure 334 may include multiple structures, one for each one of the banks 320a-320g. Alternatively, the data structure 334 may include a status field or be partitioned to identify limits and location information associated with a given one of the banks 320a-320g. In each of the one or more data structures, the granularity of tracking amount and location information of the data of the given type in a cache may vary. In some embodiments, the granularity may be at a cache line basis. In other embodiments, the granularity may be more coarse-grained, such as on a partition basis including a given number of cache lines.

In one embodiment, configuration and status registers (CSRs) 336 may be used to store programmable encoded values in order to control the allocation space for each one of the banks 320a-320g. For example, a limit of an amount of data of a given type stored in a given one of the banks 320a-320g may be programmed. The limit may be more restrictive than the storage capacity of the given bank. For example, dirty cache lines may increase the latency to transition to an inactive power mode. An inactive power mode may be a low power mode or a powered down state wherein the corresponding bank is unavailable for accesses.

Without limiting the number of cache lines in the banks 320a-320g, the write-back operations for a large number of dirty cache lines may significantly increase the latency to transition to an inactive power mode. The steps of searching for the dirty cache lines, writing back the dirty data, and evicting the cache lines consume an appreciable amount of time. In another example, the cache controller 330 may receive a memory allocation request for local data that is designated to be stored in bank 320a and determine bank 320a is unavailable. The cache controller 330 may allocate the data in another available bank, such as bank 320b. This allocation may occur despite the designated earlier assignments. For example, the bank 320b may be designated to store data for a given remote node in a multi-node system.

As allocation requests for local node data designated to be stored in bank 320a are received, the cache controller 330 may evenly distribute the corresponding data across the multiple other available banks different from the bank 320a. The allocation of the local node data may continue to occur in this manner until a limit is reached. The limit may be stored in the CSRs 336.

In response to determining the bank 320a still remains unavailable and the limit is reached, the cache controller may select a subset of the local node data in bank 320b, write-back the data, and evict the corresponding cache lines. Afterward, the cache controller 330 may allocate the received local node data in the bank 320b. In response to determining the bank 320a is available again, the cache controller 330 may reallocate at least a first subset of the local node data in the bank 320b to the bank 320a. For example, dirty local node data in the bank 320b may be reallocated. Clean local node data in the bank 320b may be evicted. Alternatively, all of the local node data in the bank 320b may be reallocated to the bank 320a.

Figure 4:
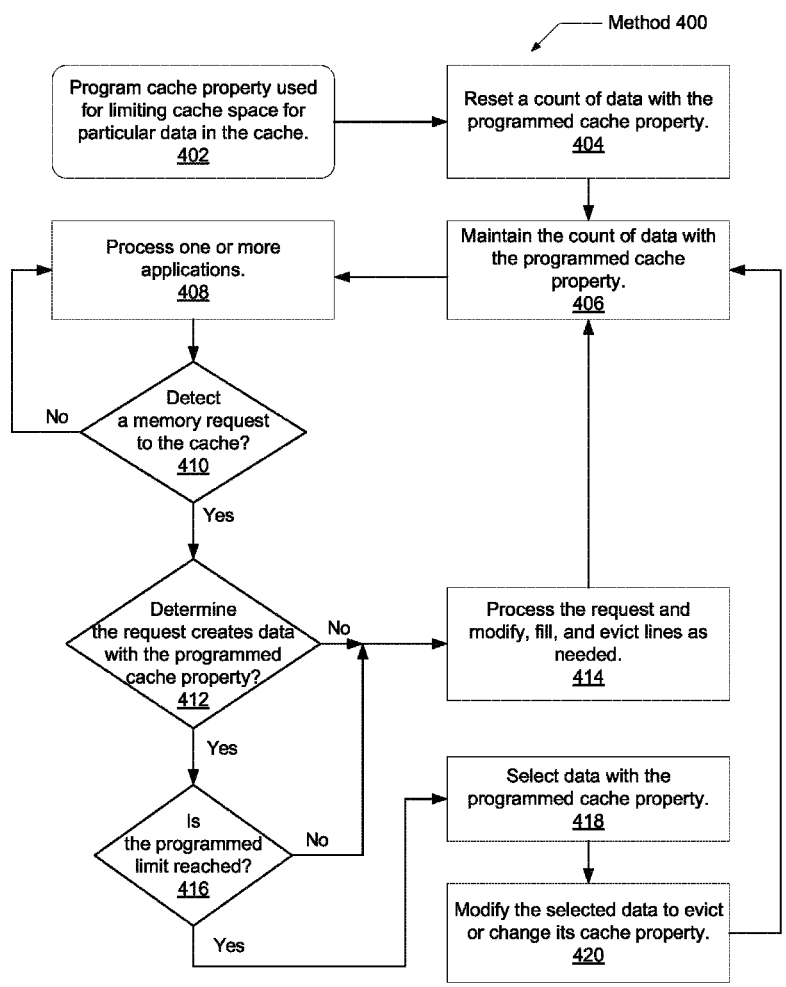
FIG. 4 is a generalized flow diagram of one embodiment of a method for efficiently allocating data in a cache.

Referring now to FIG. 4, a generalized flow diagram of one embodiment of a method 400 for efficiently allocating data in a cache is illustrated. The components embodied in the computing system and cache storage arrangements described above may generally operate in accordance with method 400. Additionally, program instructions, or generally software, executable by a processor may cause operation in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

In block 402, one or more CSR's may be programmed to limit cache space storage for particular data in the cache. Assignments of data type to particular cache partitions may be set. The type may correspond to cache properties as previously described. Limits may also be set. The limit may be a count of cache lines, ways or sets within the cache, or other. In block 404, a count maintaining the amount of data of given types stored in the cache or in a given cache partition may be reset. In block 406, the counters and corresponding logic may be readied to maintain a measurement or count of the amount of data of given types are stored. In block 408, one or more applications may be processed and the cache may be accessed.

If a memory request to the cache is detected (conditional block 410), but the request does not create data associated with one of the programmed types, such as cache properties (conditional block 412), then in block 414, the request is processed. Cache lines may be modified, evicted and filled as necessary. Control flow of method 400 may return to block 406.

If the request does create data associated with one of the programmed types (conditional block 412), and the associated programmed limit is reached (conditional block 416), then in block 418, other data with the given type is selected. In block 420, the selected data is written back to lower level memory and evicted. Other steps to modify the type of the selected data may be performed. These steps reduce the amount of data of the given type stored in the cache. The limit may not be reached anymore. Multiple cache lines may be selected for these steps. Control flow of method 400 may return to block 406. Since the original request has not yet been satisfied, control flow of method 400 may flow through blocks 406, 408, 410, 412, 416 and then 414 where the original request is handled.

Figure 5:
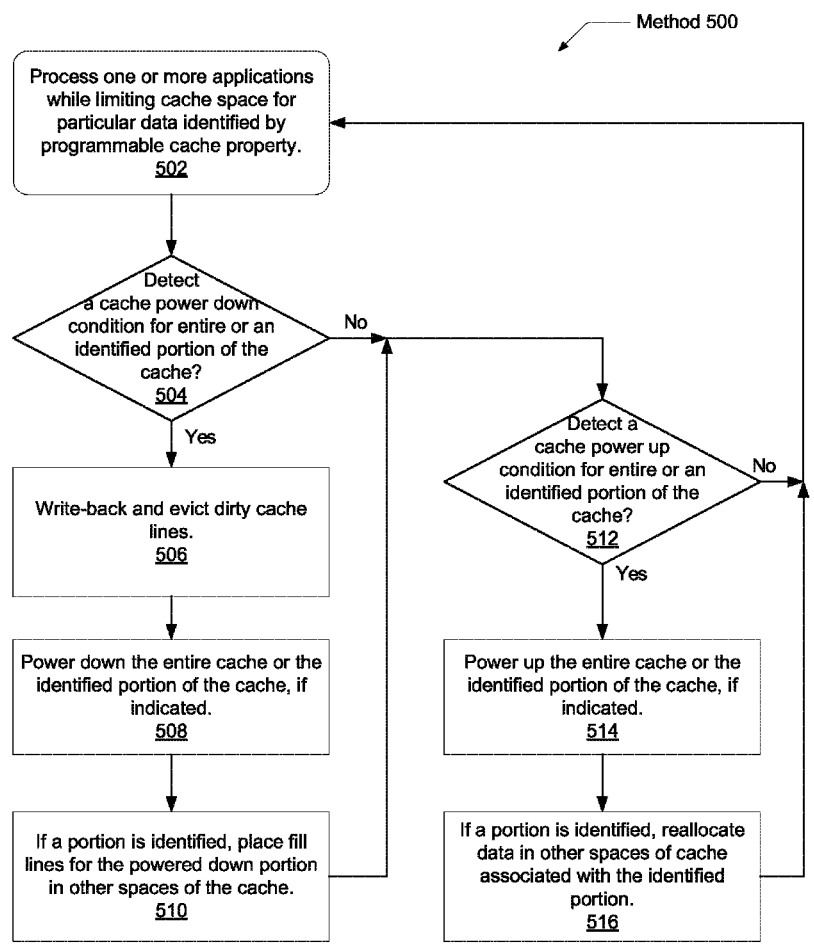
FIG. 5 is a generalized flow diagram of one embodiment of a method for efficiently allocating data in a cache with varying access availability.

Referring now to FIG. 5, a generalized flow diagram of one embodiment of a method 500 for efficiently allocating data in a cache with varying access availability is illustrated. The components embodied in the computing system and cache storage arrangements described above may generally operate in accordance with method 500. Additionally, program instructions, or generally software, executable by a processor may cause operation in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, one or more applications are processed while limiting cache space for particular data identified by programmable cache properties as previously described. If a cache power down condition for the entire cache or an identified portion of the cache is detected (conditional block 504), then in block 506, dirty cache lines are written back to lower level memory and then evicted. The number of dirty cache lines may be less than a significant amount due to maintaining programmed limits of stored data with given cache properties as previously described.

In block 508, the entire cache is powered down or placed in an inactive power mode where access is unavailable. Alternatively, if a portion of the cache is identified for power down, then the identified portion only is powered down. In block 508, when portions of the cache are powered down, corresponding fill lines for the powered down portions are placed in other spaces of the cache.

If a power up condition or request is detected (conditional block 512), then in block 514, the entire cache or the identified portion is powered up or placed in an active power mode. Access to the entire cache or the identified portion may be available again. In block 516, when portions of the cache are powered up, data corresponding to the powered up portions but are stored in other spaces of the cache are reallocated to the powered up portions.

Figure 6:
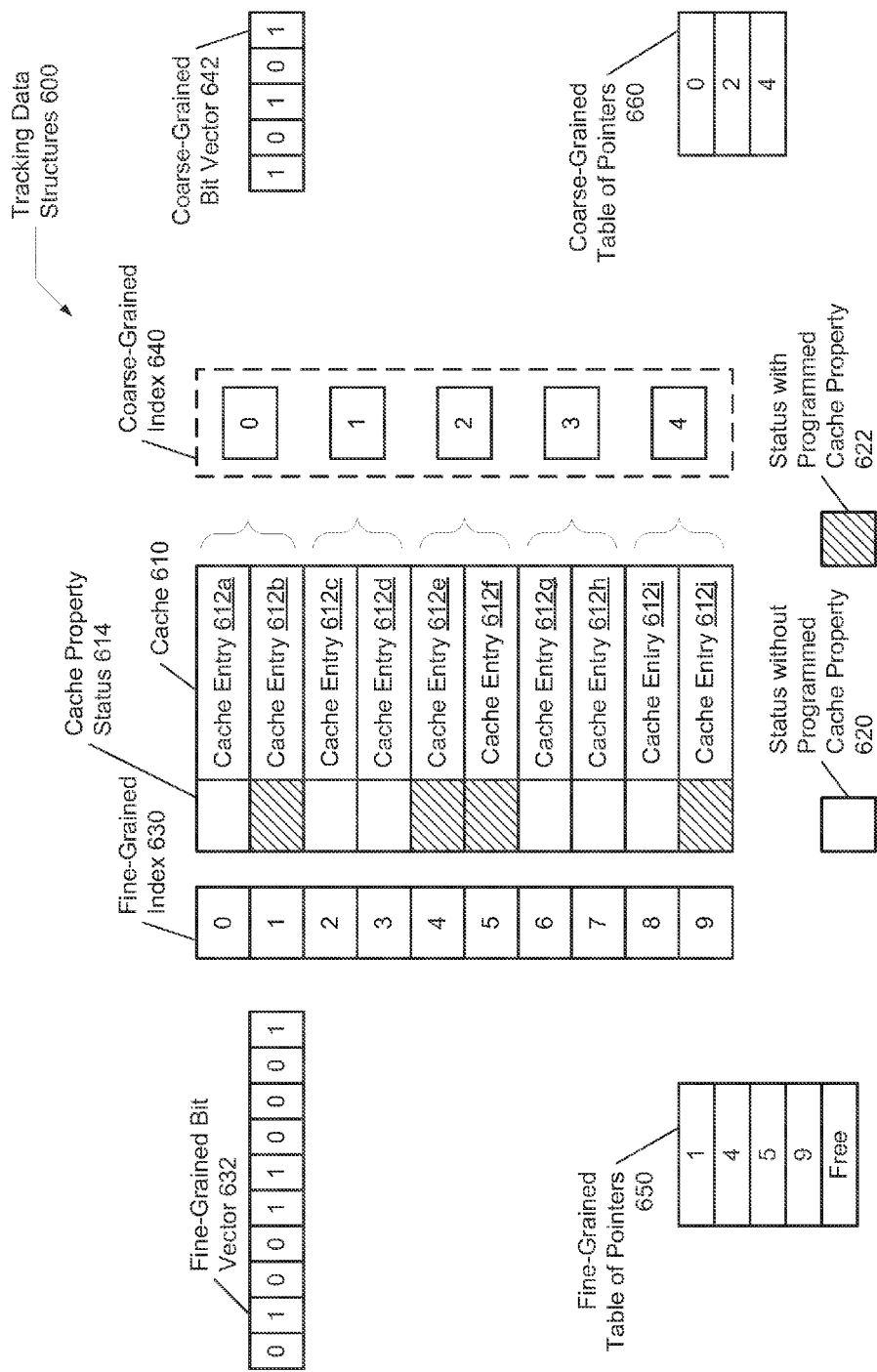
FIG. 6 is a generalized block diagram of one embodiment of tracking data structures for monitoring storage of cache data associated with given properties.

Turning now to FIG. 6, a generalized block diagram of one embodiment of tracking data structures 600 for monitoring storage of cache data associated with given properties is shown. As shown, cache 610 includes entries 612a-612j. In the embodiment shown, the cache 610 may be direct-mapped. However, in other embodiments, the cache 610 may be set-associative or fully-associative. A direct-mapped cache is used for ease of illustration.

The cache property 614 may include status field values as previously described. One or more of the entries 612a-612j may have status field values that match a programmed cache property. Block 620 may indicate entries with the programmed cache property. Block 622 may indicate entries that do not have the programmed cache property. As shown, entries 612b, 612e, 612f, and 612j store data corresponding to the programmed cache property to track.

In some embodiments, entries 612a-612j may correspond to a fine-grained index 630 used to track entries with the programmed cache property. The index 630 may not actually be implemented, but it is used for illustrative purposes. The fine-grained bit vector 632 may be used to represent the entries storing data corresponding to the programmed cache property. An asserted value may indicate a corresponding entry stores data with the cache property. An unasserted value may indicate a corresponding entry does not store data with the cache property. As shown, the left-most bit in the bit vector 632 may correspond to the top of the index 630.

Shifting the vector one at a time and counting the number of stored asserted values perform counting the number of asserted bits in the bit vector 632. Alternately, the count may be continuously maintained by incrementing each time a new entry is allocated with data with the programmed cache property and decremented each time an entry is modified to not store data with the cache property. One example of this medication is evicting the data stored in the entry.

A limit of the number of entries in the entries 612a-612j storing data with the programmed cache property may be set. When the limit is reached, given entries may be selected and have the stored data modified and/or evicted to allow allocation of new data with the cache property without exceeding the limit. The bit vector 632 may allow a corresponding cache controller (not shown) to efficiently identify and locate entries storing data with the programmed cache property. Tag accesses during a search may be skipped.

Additionally, the coarse-grained index 640 may not actually be implemented, but it is used for illustrative purposes. Entries 612a-612j may correspond to the coarse-grained index 640 used to track entries with the programmed cache property. The coarse-grained bit vector 642 may be used to represent the entries storing data corresponding to the programmed cache property. An asserted value may indicate a corresponding entry stores data with the cache property. An unasserted value may indicate a corresponding entry does not store data with the cache property. As shown, the left-most bit in the bit vector 642 may correspond to the top of the index 640.

The entries 612a-612j may be grouped into multiple collections, each including multiple entries. For example, the entries 612a-612j may include 5 collections as shown in index 640. An asserted value may indicate one or more entries within an associated collection stores data with the programmed cache property. Additional counters may be used with the coarse-grained bit vector 642 to maintain a count of asserted values within a given collection.

The fine-grained table of pointers 650 may also be used to track both amount and location information of data stored in the cache 610 with the programmed cache property. When data is allocated with the cache property, a pointer value may be inserted into the table 650. The size of the table 650, counters, or both may be used to limit the amount of data with the cache property stored in the cache 610.

The coarse-grained table of pointers 660 may also be used to track both amount and location information of data stored in the cache 610 with the programmed cache property. The table 660 may be used in a similar manner as the coarse-grained bit vector 642. Each pointer stored in the table 660 may correspond to a collection of entries. The size of the table 660, counters, or both may be used to limit the amount of data with the cache property stored in the cache 610.

Figure 7:
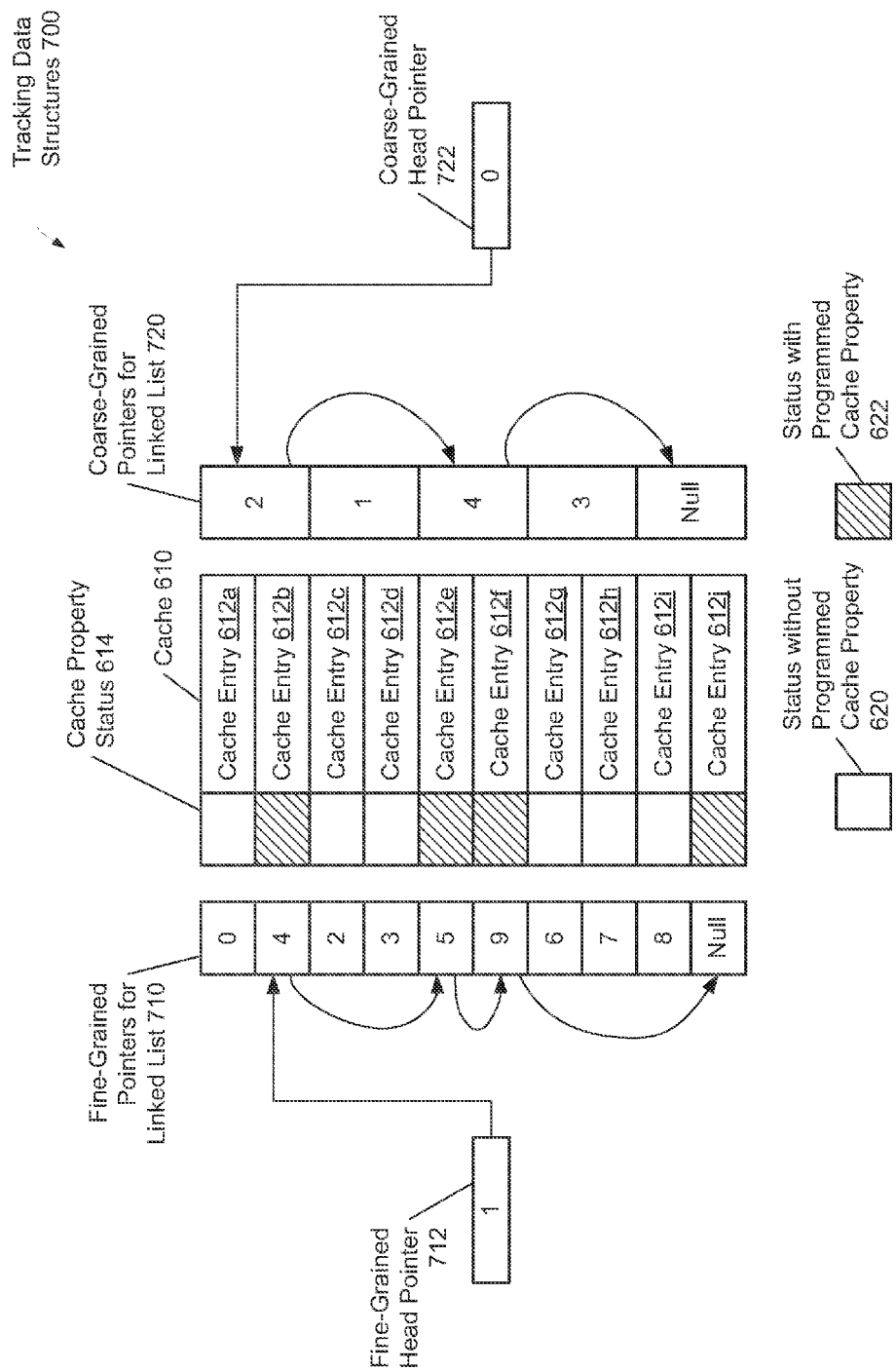
FIG. 7 is a generalized block diagram of another embodiment of tracking data structures for monitoring storage of cache data associated with given properties.

Turning now to FIG. 7, a generalized block diagram of another embodiment of tracking data structures 700 for monitoring storage of cache data associated with given properties is shown. Circuit portions that correspond to those of FIG. 6 are numbered identically. The fine-grained pointers for a linked list 710 are associated with a single, corresponding one of the entries 612a-612j. A head pointer 712 may be used to store a pointer marking the beginning of the list 710.

When data is allocated with the cache property, a pointer value may be inserted into the linked list 710 using pointer manipulation. For example, a new pointer points to a previous head pointer value, and the head pointer 712 points to the new entry that is being allocated. A NULL pointer value may be used to mark the end of the linked list 710. Counting the number of elements in the linked list 710 may be performed by the linked list 710. Alternatively, a continuous count may be maintained as previously described. The linked list 710 may be implemented as a unidirectional (singly-linked) list, as a doubly linked list, or as other similar data structure organizations.

The coarse-grained pointers for a linked list 720 are associated with a collection of entries within the entries 612a-612j. A head pointer 722 may be used to store a pointer marking the beginning of the list 720. The list 720 may be used in a similar manner as the coarse-grained bit vector 642 and the coarse-grained table 660. The size of the lists 710 and 720, counters, or both may be used to limit the amount of data with the cache property stored in the cache 610.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a cache comprising a first partition configured to store data of a first type and a second partition configured to store data of a second type; and
   a cache controller coupled to the cache, wherein in response to a request to allocate data of the first type, the cache controller is configured to:
      allocate the data of the first type in the first partition, if the first partition is available;
      allocate the data of the first type in the second partition, if (i) the first partition is unavailable and (ii) a limit on an amount of data of the first type permitted in the second partition is not reached.

2. The computing system as recited in claim 1, wherein when a limit on an amount of data of the first type permitted in the cache is reached, the cache controller is further configured to:
   select a subset of data of the first type stored in the cache;
   convert the first type of the subset to be different from the first type; and
   allocate received data of the first type in the cache.

3. The computing system as recited in claim 2, wherein the cache controller comprises a data structure for maintaining both an amount and location information of data of the first type in the cache, wherein the data structure includes at least one of the following: a bit vector, a table of pointers, and a linked list.

4. The computing system as recited in claim 1, wherein the cache controller is configured to move the data of the first type from the second partition to the first partition in response to detecting the first partition is available.

5. The computing system as recited in claim 3, wherein the cache controller is further configured to:
   allocate data of the second type in the second partition, when the second partition is available.

6. The computing system as recited in claim 1, wherein the first type of data corresponds to at least one of a cache entry valid state, a dirty state, a clean states, a home node, a local node, a remote node, a cache coherence state, a process or processor owner, a thread identifier, a system-level transaction identifier, a shared state, a private state, an instruction type, and a data type.

7. The computing system as recited in claim 1, wherein when (i) the first partition is unavailable and (ii) a limit on an amount of data of the first type permitted in the second partition is reached, the cache controller is further configured to:
   select a subset of the data of the first type stored in the second partition;
   convert the first type of the subset to be different from the first type; and
   allocate received data of the first type in the second partition.

8. The computing system as recited in claim 1, wherein the cache controller is further configured to:
   detect the first partition is unavailable when the first partition is in an inactive power mode; and
   detect the first partition is available when the first partition is in an active power mode.

9. The computing system as recited in claim 1, wherein the first type corresponds to a home node and the second type corresponds to a remote node in a multi-node system.

10. The computing system as recited in claim 9, wherein the cache is utilized in a non-uniform memory access (NUMA) architecture.

11. A method comprising:
    in response to a request to allocate data of a first type in a cache comprising a first partition configured to store data of a first type and a second partition configured to store data of a second type:
       allocating data of the first type in the first partition, when the first partition is available; and
       allocating data of the first type in the second partition, when (i) the first partition is unavailable and (ii) a limit on an amount of data of the first type permitted in the second partition is not reached.

12. The method as recited in claim 11, further comprising maintaining in a data structure both an amount and location information of the data of the first type in the cache, wherein the data structure includes at least one of the following: a bit vector, a table of pointers, and a linked list.

13. The method as recited in claim 12, wherein the method further comprises:
    allocating data of a second type different from the first type in the second partition, when the second partition is available.

14. The method as recited in claim 13, wherein the first type corresponds to a home node and the second type corresponds to a remote node in a multi-node system.

15. The method as recited in claim 13, further comprising moving the data of the first type from the second partition to the first partition in response to detecting the first partition is available.

16. The method as recited in claim 13, wherein the first type of data corresponds to at least one of a cache entry valid state, a dirty state, a clean states, a home node, a local node, a remote node, a cache coherence state, a process or processor owner, a thread identifier, a system-level transaction identifier, a shared state, a private state, an instruction type, and a data type.

17. A cache controller comprising:
    a first interface coupled to a cache array comprising a first partition configured to store data of a first type and a second partition configured to store data of a second type;

a second interface configured to receive memory requests from one or more sources configured to generate memory requests for at least data of the first type; and a control unit;

wherein in response to receiving a request to allocate data of the first type, the control unit is configured to:
   allocate the data of the first type in the first partition, if the first partition is available;
   allocate the data of the first type in the second partition, if (i) the first partition is unavailable and (ii) a limit on an amount of data of the first type permitted in the second partition is not reached.

18. The cache controller as recited in claim 17, wherein the control unit is further configured to:
   allocate data of a second type different from the first type in the second partition, when the second partition is available.

19. The cache controller as recited in claim 18, wherein the first type of data corresponds to at least one of a cache entry valid state, a dirty state, a clean states, a home node, a local node, a remote node, a cache coherence state, a process or processor owner, a thread identifier, a system-level transaction identifier, a shared state, a private state, an instruction type, and a data type.

* * * * *

UNITED STATES PATENT AND TRADEMARK OFFICE
CERTIFICATE OF CORRECTION

PATENT NO. : 9,075,730 B2  
APPLICATION NO. : 13/725011  
DATED : July 7, 2015  
INVENTOR(S) : Thottethodi et al.

Page 1 of 1

It is certified that error appears in the above-identified patent and that said Letters Patent is hereby corrected as shown below:

In the Claims:

Column 13, Claim 6, Line 66, please delete "a clean states" and substitute -- a clean state --.

Column 14, Claim 16, Line 58, please delete "a clean states" and substitute -- a clean state --.

Column 15, Claim 19, Line 20, please delete "a clean states" and substitute -- a clean state --.

Signed and Sealed this  
Third Day of November, 2015

Michelle K. Lee  
*Director of the United States Patent and Trademark Office*